T. H. JACKSON.
BASE BALL BOARD.
APPLICATION FILED MAY 26, 1913.

1,166,218.

Patented Dec. 28, 1915.
3 SHEETS—SHEET 2.

Witnesses
R. S. Trogner.
J. D. Morrill

Inventor
Thomas H. Jackson,
By Mason Fenwick Lawrence,
Attorneys

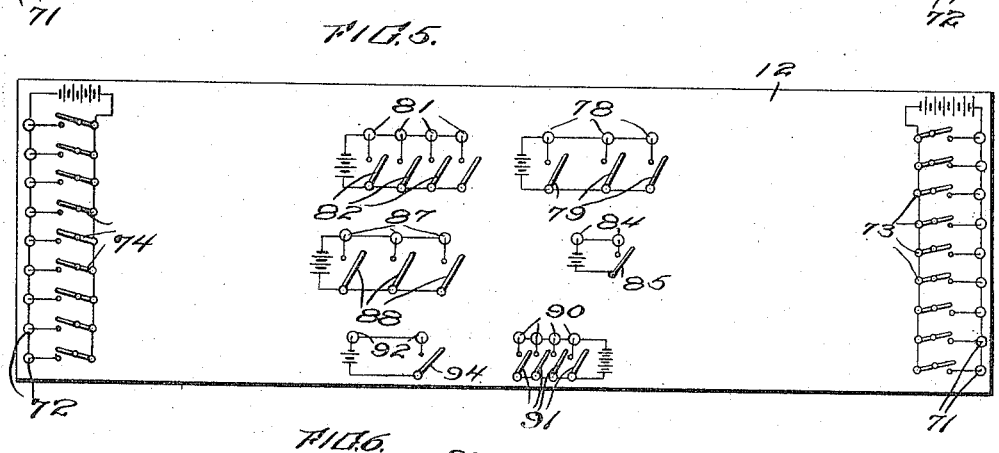

UNITED STATES PATENT OFFICE.

THOMAS H. JACKSON, OF SCRANTON, PENNSYLVANIA.

BASE-BALL BOARD.

1,166,218.  Specification of Letters Patent.  Patented Dec. 28, 1915.

Application filed May 26, 1913. Serial No. 770,048.

*To all whom it may concern:*

Be it known that I, THOMAS H. JACKSON, a citizen of the United States, residing at No. 1102 Jackson street, Scranton, in the county of Lackawanna and State of Pennsylvania, have invented certain new and useful Improvements in Base-Ball Boards; and I do hereby declare the following to be a full, clear, and exact description of the invention, such as will enable others skilled in the art to which it appertains to make and use the same.

This invention relates to game boards and has for an object to provide a board adapted for exemplifying the game of base-ball to be played by the use of figures such as that disclosed in Patent 1,053,817.

An object of the invention is to provide a plurality of rows of electric lamps with means to manually light such lamps in succession to indicate the course of a ball starting from the batter's position and terminating in the field.

A further object of the invention is to provide a device resembling as nearly as possible an actual ball field, with slotted guides for the movement thereover of figures representing the players, and especially with guides along and leading to said rows of lamps.

With these and other objects in view, the invention comprises certain novel constructions, combinations and arrangement of parts as will be hereinafter more fully described and claimed.

Figure 1:
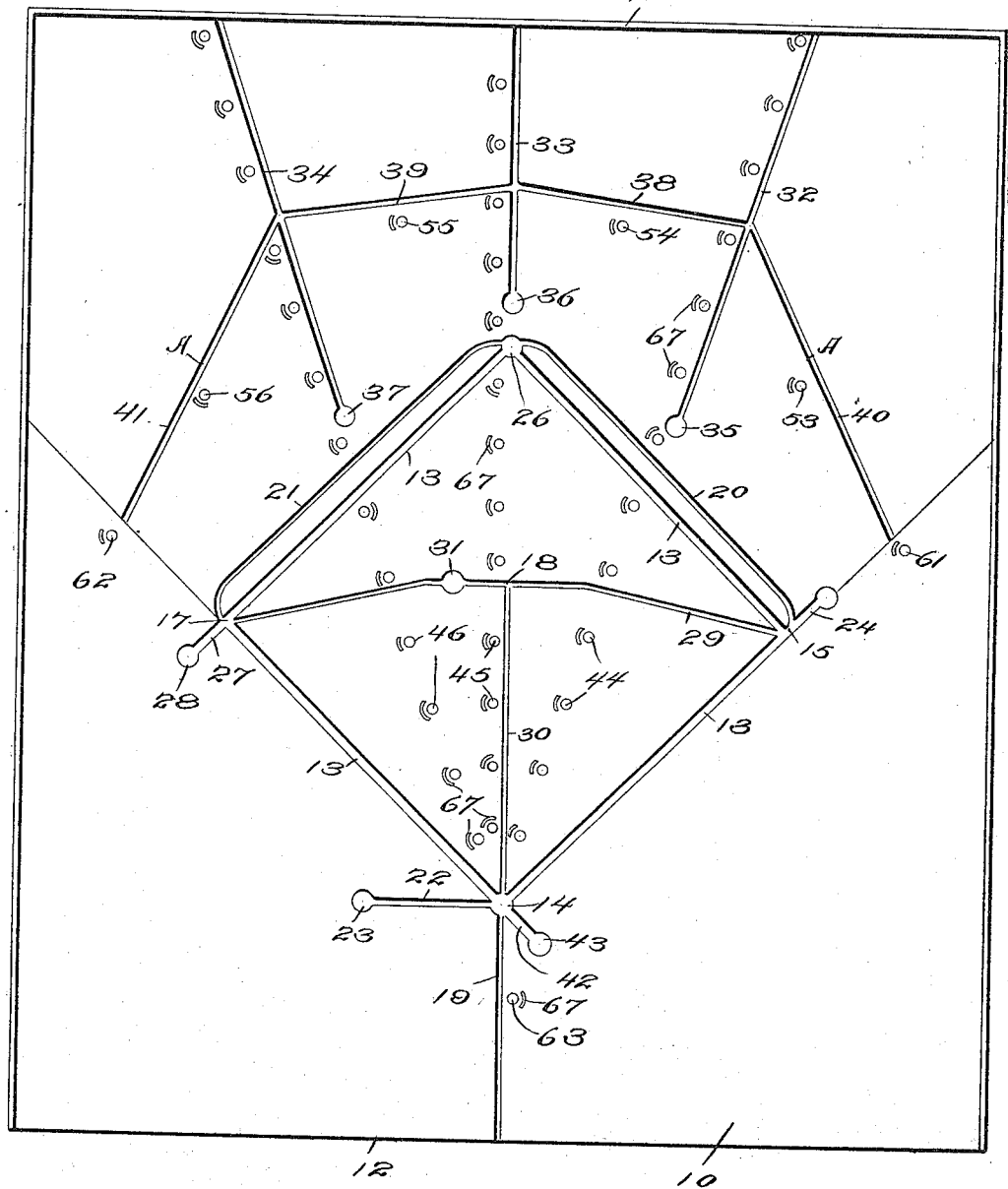
Figure 2:
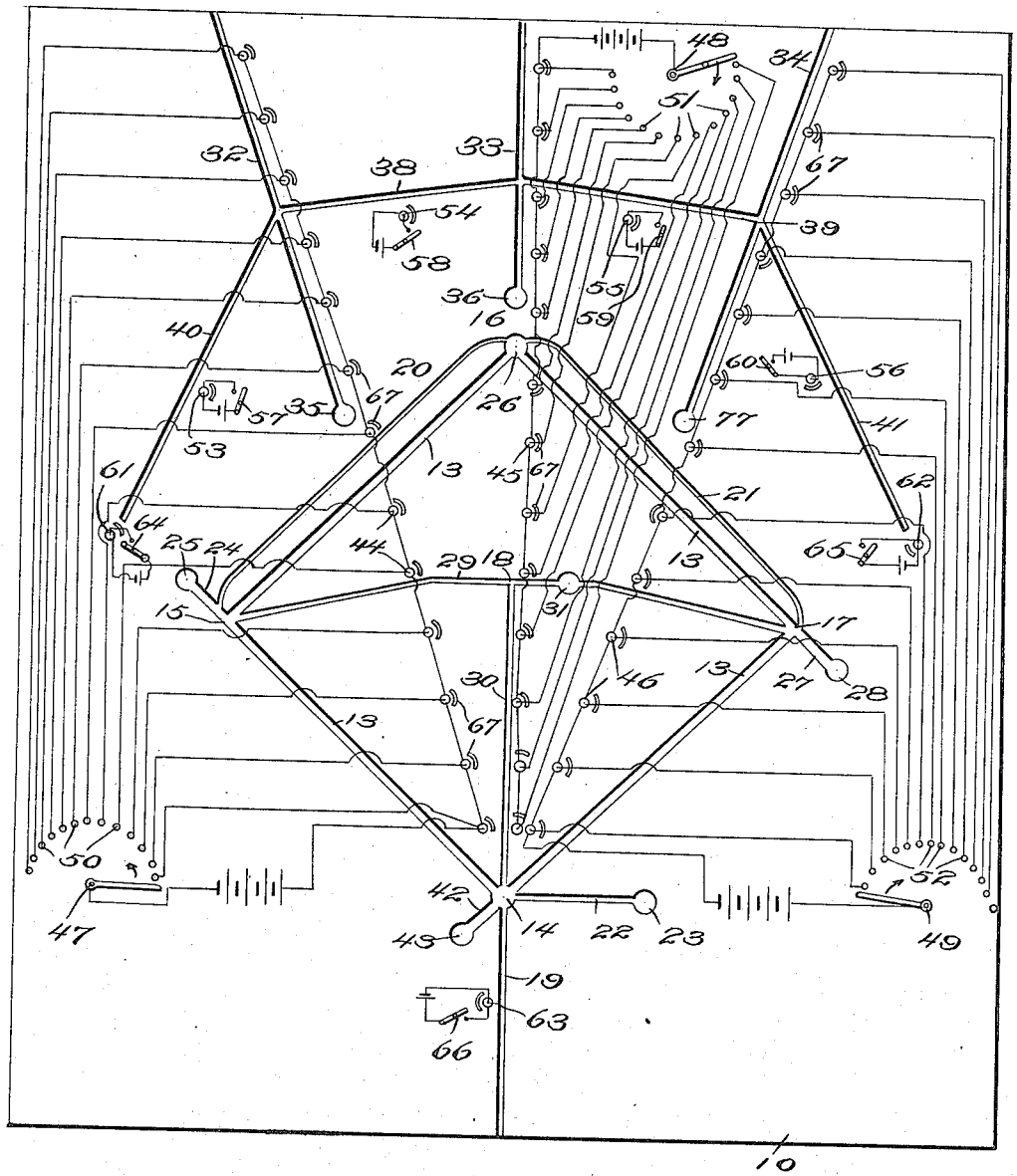

In the drawings: Figure 1 is a plan view of the improved board. Fig. 2 is an inverted plan view of the board showing the electrical circuits diagrammatically. Fig. 3 is a view of the back board of the field. Fig. 4 is a view of the front board or foreground. Fig. 5 is a view of the rear of the front board shown at Fig. 4. Fig. 6 is a view in elevation of an auxiliary fly indicating apparatus.

Like characters of reference indicate corresponding parts throughout the several views.

The improved game board which forms the subject matter of this application comprises a substantially plane base or platform 10 having a back board 11 erected at the side of the board opposite the observer with a front board 12 at the front of the field.

Upon the board 10 a diamond is provided consisting of a guide slot 13 of the usual rectangular form having the position 14 for home base, 15 for first base, 16 for second base and 17 for third base. Along this and other guide slots figures as disclosed in the aforesaid patent are moved manually from the under side of the base 10 and operated to disclose various plays made by such figures. For instance, a figure at home base 14 is supposed to be the batter and when a hit is made the batter runs along the line and the figure is moved along the guide to first base and if the play permits continues around to home base as in a regular game. A position 18 is provided for a pitcher who is supposed to throw the ball over the home base to the catcher operating in slot 19. To the rear of the catcher in the slot 19 a figure representing an umpire is also located. Outside of the diamond represented by the slot 13 other guide slots 20 and 21 are provided for the base men, the figures of which are not permitted to enter the diamond to interfere with the movement of the figures representing the runners. The three base men are operated as occasion requires in the slots 20 and 21 from first around second to third base. A slot 22 is provided having one end terminating at home base and the other end terminating in an opening 23 through which a figure is inserted from underneath the base 10 when a batter goes to bat. At first base an extension slot 24 is provided terminating in an opening 25 through which the figure of the runner is withdrawn if out at first. At second base an opening 26 is provided through which the runner is withdrawn if out at second, with a like slot 27 and opening 28 for the withdrawal of the figure if out at third.

From the pitcher's box at 18 a slot 29 is provided extending across from 1st to 3rd base so that the pitcher may move across as occasion may require with a slot 30 extending from the box to home base so that the pitcher may run down to home base to confer with the catcher. An opening 31 is provided through which the pitcher may be inserted and withdrawn as the play is in or out. In the field guide slots 32, 33 and 34 are provided for right, center and left fielders respectively which said slots terminate in openings 35, 36 and 37 for the insertion and withdrawal of the fielder figures. Slots 38 and 39 also extend from the center fielder's slot in opposite directions to the right and left fielders' slots respectively so that the fielders may run across, and slots 40 and 41 are also provided for the fielders to run on the line for flies and fouls. At the home base a slot 42 and opening 43 is provided for the withdrawal of catchers, umpire and players generally.

It will be seen that provision is made for the movement of the figures to represent players in the usual manner so far as the running is concerned. To represent the action of the ball a plurality of rows of lamps 44, 45 and 46 are provided starting from adjacent the home plate and diverging along the fielder guides 34, 33 and 32 respectively. The several lines of lamps 44, 45 and 46 are respectively controlled by switches 47, 48 and 49 which are shown diagrammatically at Fig. 2, it being understood that in the use of the board these various switches are located conveniently so that any or all may be controlled by a single operator. The same is true of all other switches which will be referred to hereinafter, the same being located in the drawing conventionally only to show the electrical connection with the various lamps. The arms of the several switches 47, 48 and 49 are pivoted so as to connect with terminals 50, 51 and 52 preferably arranged in an arc so that the switch arm may swing around such arc to successively illuminate the lamps appearing in the several lines 44, 45 and 46. The lighting may be accomplished by current from any convenient source but independent sources of energy have been shown in the several circuits for illuminating the several lamps. It will be understood that if a ground ball starts from the home base the arms of the proper switch 47, 48 or 49 will be rotated in the direction indicated by the arrows at Fig. 2 which will successively light and extinguish the line of lamps thereby indicating the progress of the ball along the field. If the ball moves over the entire distance the switch is rotated throughout its entire arc. If the ball is only a "bunt" the switch is moved only one or two contacts while if the ball is stopped at second base for instance the switch 48 is rotated only to indicate the movement of the ball as far as second. If a fly ball is struck by the batter to the far field the switch arm may be moved in the opposite direction to contact only with the extreme contact which lights only the extreme lamp to indicate that a fly has been struck to the far field. To indicate flies intermediate the lines of lights 44, 45 and 46 lamps 53, 54, 55 and 56 are provided controlled respectively by switches 57, 58, 59 and 60 so that the operator may indicate a fly ball at points between or outside the lines of lamps described. To indicate foul balls lamps 61, 62 and 63 are also provided controlled respectively by switches 64, 65 and 66.

It will be noted that each lamp is at or adjacent one of the guide slots so that when the ball is indicated as being at a particular position one of the figures may move along the slot to secure the ball, the securing of the ball being in the manner indicated in the aforesaid patent.

Adjacent each of the lights a slight opening 67 or peep hole 67 is provided, so that the operator under the board will be able to detect when the lights are properly working and which lamps are lighted.

The back board is provided with the usual score indicating table 68 shown at Fig. 3 while the front board is provided with the usual racks 69 and 70 for the insertion of slides to indicate the line-up. Adjacent each of the slides of the line-up lamps 71 and 72 are provided controlled by switches 73 and 74, the column of lights being headed by the word "Batting" as indicated at 75 and 76 respectively, the light showing at the end of the strip indicating that the player named upon that strip is then at bat. Upon the front board is also the word "Strikes" as indicated at 77 with three lamps 78 interspersed among the letters, controlled by separate switches 79. These several switches 79 are independently operable so that one, two or three strikes may be exhibited interwoven with the word. At 80 the word "Balls" is also exhibited with four lamps 81 interspersed among the letters with independent switches 82 for controlling them in similar manner. The word "Safe" also appears upon the front board at 38 with lamps 84 controlled by a single switch 85 so that if the decision of the umpire is that the player is safe the lights are exhibited to indicate such decision. The word "Outs" is also shown at 86 with lamps 87 and independent switches 88 for controlling the same. The word "Runs" is also shown at 89 with lamps 90 and switches 91 for independently controlling the same, while a fly ball is indicated by two lamps 92 interspersed in the letters of the word "Fly-Ball" as indicated at 93 controlled by a single switch 94.

As before explained all of the various switches are closely grouped so that a single operator of the electrical devices will operate all of the switches to indicate the various plays, decisions and results as above stated. With, therefore, operators located beneath the board to operate the figures in the slots and an operator at the switch board for operating the various switches for the electrical devices it will be obvious that the various plays of a game will be faithfully reproduced upon the board.

In the usual operation of the board the plays will be made responsive to telegraphic information received from a game transpiring at some distant point so that observers will see by the board the actual reproduction of the game as being played at such distant point just as the play is made. It is, of course, intended that the board, figures and other apparatus shall be in miniature so that it can be readily exhibited in amusement places and the like but the size of the apparatus forms no part of the present invention or any restriction or limitation upon the same.

It will also be obvious that the various lights may be colored according to a predetermined system of exhibiting as for instance red lights may be employed for foul balls with any other system of illumination that may be found advantageous.

In addition to the apparatus carried by the board itself an auxiliary apparatus is employed as shown at Fig. 6. This consists of a pole 95 which may be constructed substantially as a fishing pole or other light rod. At the extremity of the pole a light bulb 96 is carried connected through wiring 97 with a battery 98 carried at the handle end of the pole with a switch 99 for lighting the bulb 96. In using this auxiliary device the pole is placed with the light adjacent home base and when a fly ball is struck the lamp 96 is lighted and the pole moved to move the light as a fly across the field in any direction required to the player supposed to get said fly as described in aforesaid patent. After reaching the point at which said player should be located the light at the end of the pole is extinguished and the bulb lighted in the hand of the player indicating that the player catches the fly ball. Should the player "muff" the ball the light in the player's hand is extinguished and he stoops to the ground indicating picking up the ball. If the player gets the ball the bulb is relighted in his hand, he straightens up and throws to any other player on the diamond, the throw being indicated by the light being extinguished and the bulb lighted in the hand of the player catching.

The light at the end of the pole can be used to represent a ground hit in any direction by drawing the light along the surface of the board and can be used to represent such ground hit irrespective of the lights in rows to each of the fields which light is instantly lighted and the light 96 extinguished so that the ball appears to touch the ground at the point of one of the aforesaid lights indicating a fly. The device shown at Fig. 6 may be operated from one side of the board when the latter stands upright and the game is exhibited in a theater or other auditorium employing a stage with the usual scenery or the device may be operated from above by a person located among the flies.

I claim:—

1. In a baseball board, a platform inscribed with a diamond and its bases, a plurality of rows of lamps diverging from home base and extending straight across the diamond and field, and means to illuminate the lamps of any row independently and successively, beginning with home base, said platform having guide-slots for figures of the players outside the diamond and adjacent to and parallel with said rows.

2. In a baseball board, the combination with a platform inscribed with the usual diamond and its bases, and having guide-slots in the field beyond the diamond and on lines radiating from home base, for the reception of figures indicating the players; of a plurality of rows of electric lamps radiating from home base across the diamond and field and within the latter passing alongside its radial slots, the platform having peep holes alongside said rows, and means for illuminating the lamps of any row successively, beginning with the home base, for the purpose set forth.

In testimony whereof I affix my signature in presence of two witnesses.

THOMAS H. JACKSON.

Witnesses:
W. W. BAYLOR,
J. R. SITTERLUP.